(12) United States Patent
Masui

(10) Patent No.: US 7,082,511 B2
(45) Date of Patent: Jul. 25, 2006

(54) ADDRESS TRANSLATION UNIT PERFORMING ADDRESS TRANSLATION FROM VIRTUAL ADDRESS TO PHYSICAL ADDRESS

(75) Inventor: Norio Masui, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 352 days.

(21) Appl. No.: 10/700,573

(22) Filed: Nov. 5, 2003

(65) Prior Publication Data

US 2004/0098559 A1    May 20, 2004

(30) Foreign Application Priority Data

Nov. 14, 2002  (JP)  ............................. 2002-330645

(51) Int. Cl.
*G06F 12/10* (2006.01)
(52) U.S. Cl. ...................................... 711/202; 711/203
(58) Field of Classification Search ...................... None
See application file for complete search history.

(56) References Cited

U.S. PATENT DOCUMENTS

| | | | | |
|---|---|---|---|---|
| 5,226,133 A | * | 7/1993 | Taylor et al. ................ | 711/207 |
| 5,574,877 A | * | 11/1996 | Dixit et al. ................. | 711/207 |
| 5,809,522 A | * | 9/1998 | Novak et al. ............... | 711/118 |
| 6,266,755 B1 | * | 7/2001 | Yeager ....................... | 711/210 |
| 6,453,387 B1 | * | 9/2002 | Lozano ....................... | 711/133 |
| 6,604,187 B1 | * | 8/2003 | McGrath et al. ............ | 711/209 |
| 2002/0133685 A1 | * | 9/2002 | Kalyanasundharam ...... | 711/207 |

FOREIGN PATENT DOCUMENTS

| JP | 4-262436 | 9/1992 |
|---|---|---|
| JP | 7-282587 | 10/1995 |

OTHER PUBLICATIONS

Masaya Sumita, "A 800MHz Single Cycle Access 32Entry Fully Associative TLB with a 240ps Access Match Circuit", 2001 Symposioum on VLSI Circuits Digest of Technical Papers, 2001, pp. 1-2.

* cited by examiner

*Primary Examiner*—Matthew Kim
*Assistant Examiner*—Michael Krofcheck
(74) *Attorney, Agent, or Firm*—Oblon, Spivak, McClelland, Maier & Neustadt, P.C.

(57) ABSTRACT

Provided is a TLB that can translate rapidly a virtual address to a physical address at small power consumption. A tag entry part (808) includes an ASID hold part (810), virtual address hold part (811), valid bit part (812), ASID comparison judgment part (102), and a virtual address comparison judgment part (104). By an ASID match line (105), a plurality of CAM cells (813) of the ASID hold part (810) are connected in parallel to each other and also connected to the ASID comparison judgment part (102). By a virtual address match line (106), a plurality of CAM cells (813) of the virtual address hold part (811) are connected in parallel to each other and also connected to the virtual address comparison judgment part (104). An ASID effective signal (107) is provided from the ASID comparison judgment part (102) to the virtual address comparison judgment part (104).

15 Claims, 9 Drawing Sheets

ADDRESS TRANSLATION UNIT PERFORMING ADDRESS TRANSLATION FROM VIRTUAL ADDRESS TO PHYSICAL ADDRESS

BACKGROUND OF THE INVENTION

1. Field of the Invention

The present invention relates to an address translation unit that translates a virtual address to a physical address and, in particular, a translation look-aside buffer (hereinafter referred to as a "TLB") for address translation in a memory management unit (MMU) that is used along with a central processing unit (CPU) handling a virtual memory system.

2. Description of the Background Art

A CPU handling a virtual memory system outputs a virtual memory address on a logical memory space when the CPU accesses an instruction and data. However, the actual instruction and data are held at a physical address on a physical space. Therefore, an MMU is used to perform translation from the virtual address to the physical address. In this occasion, a TLB contained in the MMU is used to perform high-speed address translation.

As a conventional technique of semiconductor devices using a virtual memory system, for example, Japanese Patent Application Laid-Open No. 4-262436 (columns 1–2, FIGS. 3–4) presents the configuration of an address translation buffer circuit employing a content addressable memory (CAM) cell as a tag part. Specifically, this publication shows such a configuration of comparing a process identification number for identifying the individual space of a multiple virtual storage space with an effective address for access in the tag part.

Meanwhile, Japanese Patent Application Laid-Open No. 7-282587 (columns 13–14, FIG. 4) presents an example of CAM configuration that reduces the parasite capacity of a match line in order to increase the speed of a TLB used for address translation from a virtual address to a physical address.

It is required that address translation from a virtual address to a physical address be performed at high speed. To accomplish this, a number of attempts to increase the speed of address translation, e.g., a reduction in the parasitic capacity of a match line, have been made in the past without great success.

SUMMARY OF THE INVENTION

It is an object of the present invention to provide a TLB that can rapidly translate a virtual address to a physical address at low power consumption.

According to a first aspect of an address translation unit of the present invention, an address translation unit performs address translation from a virtual address to a physical address. The address translation unit includes a data entry part holding data of the physical address, and a tag entry part storing an address space identifier and virtual address as a tag of the data entry part. The tag entry part includes (i) an address space identifier hold part holding the address space identifier, (ii) an address space identifier comparison judgment part comparing an address space identifier hold value held in the address space identifier hold part with an address space identifier input value to be inputted newly, (iii) a virtual address hold part holding the virtual address, and (iv) a virtual address comparison judgment part comparing a virtual address hold value held in the virtual address hold part with a virtual address input value to be inputted newly. The virtual address comparison judgment part has a charge circuit for charging its output line and a charge inhibit circuit for inhibiting charge to the output line. In the virtual address comparison judgment part, a potential state of the output line is controlled based on the comparison result between the address space identifier hold value and the address space identifier input value, to determine execution or non-execution of comparison operation between the virtual address hold value and the virtual address input value at the time of address translation.

The virtual address comparison judgment part has the charge circuit for charging its output line and the charge inhibit circuit for inhibiting charge to the output line. In the virtual address comparison judgment part, a potential state of the output line is controlled based on the comparison result between the address space identifier hold value and the address space identifier input value, to determine execution or non-execution of comparison operation between the virtual address hold value and the virtual address input value at the time of address translation. Therefore, no comparison operation is required in the virtual address comparison judgment part depending on the comparison result of the address space identifiers, thereby reducing power consumption. In addition, the translation operation from a virtual address to a physical address is executable without using the address space identifier hold part and address space identifier comparison judgment part. This enables to reduce power consumption and also reduce parasitic capacity, thereby increasing comparison speed.

According to a second aspect of the address translation unit of the present invention, an address translation unit performs address translation from a virtual address to a physical address. The address translation unit includes a data entry part holding data of the physical address, and a tag entry part storing an address space identifier and virtual address as a tag of the data entry part. The tag entry part includes (i) a valid bit part holding information as to whether data of the tag entry part is valid, (ii) an address space identifier hold part holding the address space identifier, (iii) an address space identifier comparison judgment part comparing an address space identifier hold value held in the address space identifier hold part and a valid bit hold value held in the valid bit part, with an address space identifier input value and valid bit input value that are inputted newly, (iv) a virtual address hold part holding the virtual address, and (v) a virtual address comparison judgment part comparing a virtual address hold value held in the virtual address hold part with a virtual address input value to be inputted newly. The virtual address comparison judgment part determines execution or non-execution of comparison operation between the virtual address hold value and the virtual address input value at the time of address translation, based on the comparison result between the address space identifier hold value and the address space identifier input value, and the information as to whether data of the tag entry part is valid.

The virtual address comparison judgment part determines execution or non-execution of comparison operation between the virtual address hold value and the virtual address input value at the time of address translation, based on the comparison result between the address space identifier hold value and the address space identifier input value, and the information as to whether data of the tag entry part is valid or invalid. Therefore, no comparison operation is required in the virtual address comparison judgment part depending on the comparison result of the address space identifiers and the information as to whether data of the tag entry part is valid or invalid, thereby reducing power consumption. Further, since the information as to whether data of the tag entry part is also used as a judgment source, the effectiveness of data of the tag entry part is also taken as a judgment object, thereby increasing comparison precision. Furthermore, the translation operation from a virtual address to a physical address is executable without using the address space identifier hold part and address space identifier comparison judgment part. This enables to reduce power consumption and also reduce parasitic capacity, thereby increasing comparison speed.

These and other objects, features, aspects and advantages of the present invention will become more apparent from the following detailed description of the present invention when taken in conjunction with the accompanying drawings.

DESCRIPTION OF THE PREFERRED EMBODIMENTS

A. First Preferred Embodiment

<A-1. Unit Configuration>

<A-1-1. Overall Configuration>

A translation look-aside buffer (hereinafter referred to as a "TLB") 100 according to a first preferred embodiment of the present invention will be described with reference to FIG. 1.

Figure 1:
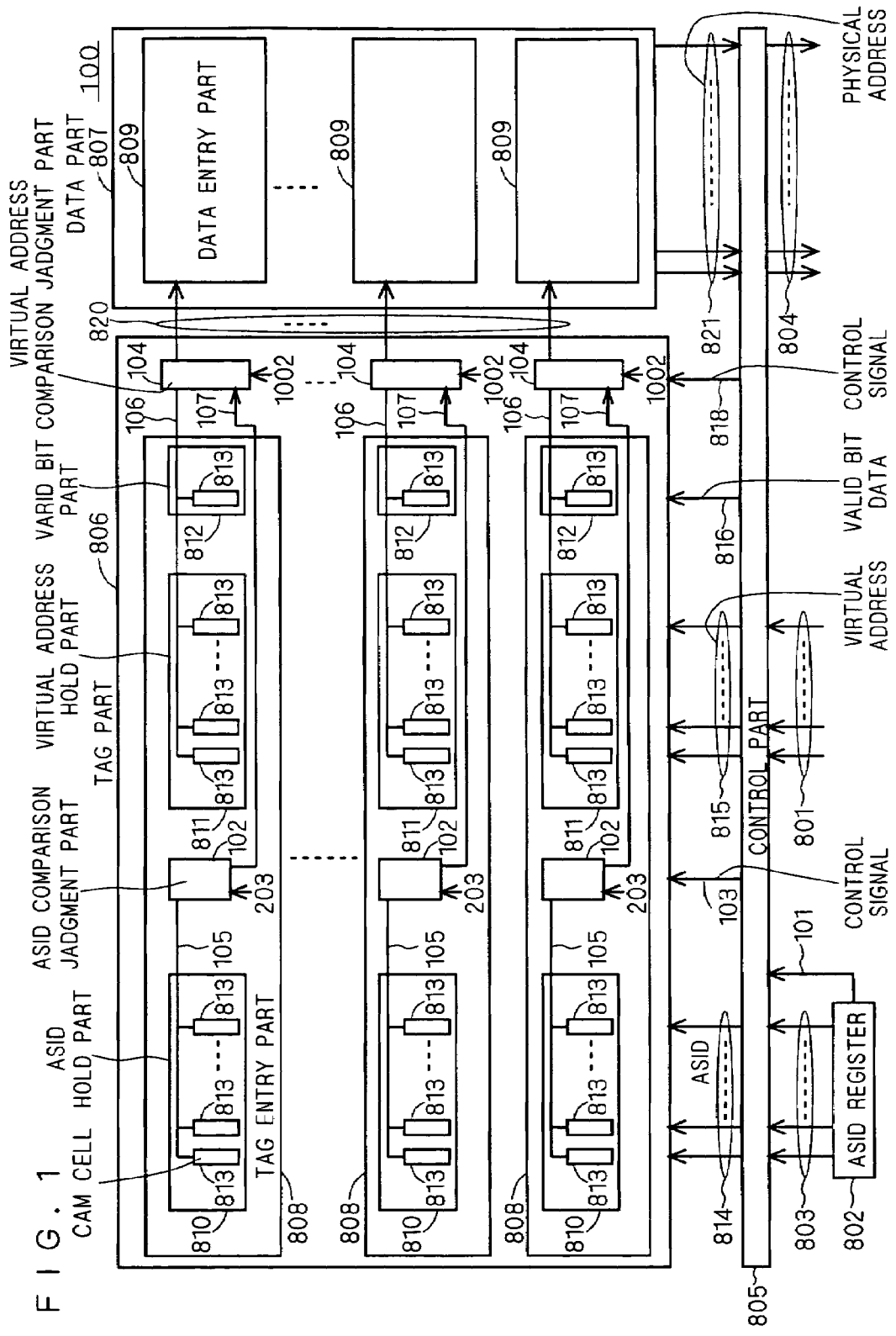
FIG. 1 is a block diagram to explain the configuration of a TLB according to a first preferred embodiment of the present invention.

Referring to FIG. 1, the TLB 100 is mainly configured by a control part 805 for controlling operations, a tag part 806 for holding a virtual address, and a data part 807 that holds a physical address corresponding to the virtual address held in the tag part 806.

A virtual address outputted from a CPU (not shown) located externally is provided via a virtual address input path 801 to the control part 805. From an ASID register 802 that holds an address space identifier (hereinafter referred to as an "ASID"), indicating the association between an access and address space, an ASID is provided via an ASID input path 803 to the control part 805. The ASID register 802 provides the control part 805 with an ASID register change notice signal 101 to notice that the content of the ASID register 802 has been changed.

A physical address is outputted from the control part 805 to the exterior via a physical address output path 804.

Between the control part 805 and tag part 806, there are the following connections: an ASID transmission path 814 through which an ASID is inputted from the control part 805 to the tag part 806; a transmission path 103 for an ASID comparison control signal 203 that controls ASID comparison judgment operation; a virtual address transmission path 815 through which a virtual address is inputted from the control part 805 to the tag part 806; a valid bit data transmission path 816 through which a valid bit data is inputted from the control part 805 to the tag part 806; and a control signal transmission path 818 through which a virtual address comparison control signal 1002 for controlling comparison judgment operation is inputted from the control part 805 to the tag part 806.

In addition, the control part 805 is connected to the data part 807 by a physical address transmission path 821 through which the physical address read out from the data part 807 is sent to the control part 805.

<A-1-2. Tag Part Configuration>

Tag part 806 includes a plurality of tag entry parts 808 for holding paired ASIDs and virtual addresses.

The tag entry part 808 has (i) an ASID hold part 810 for holding an ASID, (ii) a virtual address hold part 811 for holding a virtual address, (iii) a valid bit part 812 for holding information as to whether the data held in the tag entry part 808 is valid or not, (iv) an ASID comparison judgment part 102 that makes a comparison judgment between an inputted ASID and the hold content of the ASID hold part 810 in the tag entry part 803, and (v) a virtual address comparison judgment part 104 that makes comparison judgments between an inputted virtual address and the hold content of the virtual address hold part 811 in the tag entry part 808, and between an inputted valid bit data and the hold content of the valid bit part 812.

An ASID comparison judgment part 102 and single virtual address comparison judgment part 104 are provided per tag entry part 808.

The ASID hold part 810 and virtual address hold part 811 are each configured by a plurality of content addressable memory cells (hereinafter referred to as "CAMs") 813. The valid bit part 812 is configured by one CAM cell. The valid bit part 812 indicates whether the data held at the tag entry part 808 is valid or not, based on such relatively simple information that a CAM cell 813 of the valid bit part 812 holds data "0" in the tag entry part 808 having no data, and the cam cell 813 holds data "1" for the tag entry part 808 having any data.

By an ASID match line 105, a plurality of CAM cells of the ASID hold part 810 in the tag entry part 808 are connected in parallel to each other and also connected to the ASID comparison judgment part 102. The ASID match line 105 is used for ASID comparison operation.

By a virtual address match line 106, a plurality of CAM cells 813 of the virtual address hold part 811 in the tag entry part 808 and a plurality of CAM cells 813 in the valid bit part 812 are connected in parallel to each other and also connected to the virtual address comparison judgment part 104 corresponding to the above-mentioned tag entry part 808. The virtual address match line 106 is used for valid bit comparison operation.

It is also configured such that an ASID effective signal 107 is provided from the ASID comparison judgment part 102 to the virtual address comparison judgment part 104.

<A-1-3. Data Part Configuration>

The data part 807 has a plurality of data entry parts 809 each holding a single physical address data. The number of the data entry parts 809 is equal to that of the tag entry parts 808 in the tag part 806, and a single data entry part 809 and a single tag entry part 808 operate in pairs.

Specifically, the paired tag entry parts 808 function as a tag to the individual data entry part 809, and the value of the virtual address match line 106 of each tag entry part 808 in the tag part 806 is sent via a comparison result notice path 820 to the data part 807 and then provided to the data entry part 809 paired with the tag entry part 808.

<A-1-4. ASID Comparison Judgment Part Configuration>

Figure 2:
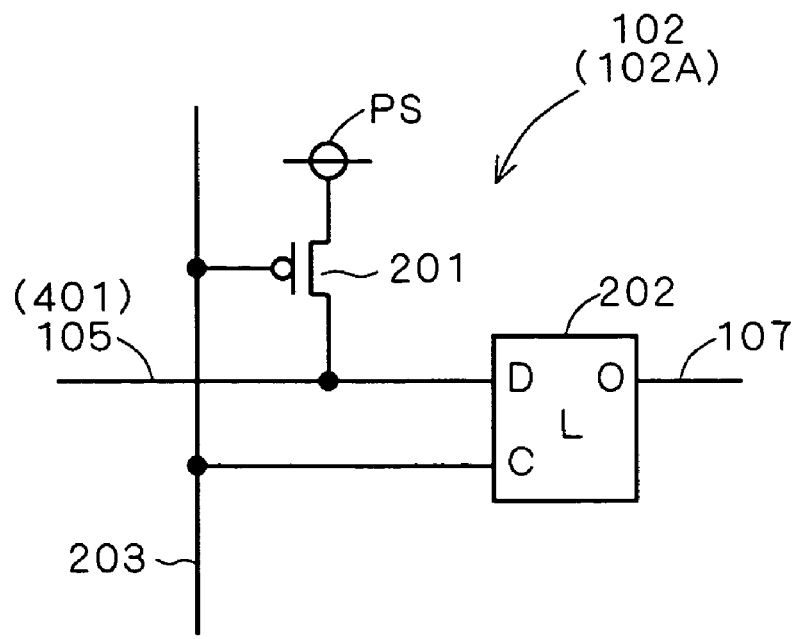
FIG. 2 is a diagram showing the configuration of an ASID comparison judgment part.

FIG. 2 shows an example of the circuit configuration of an ASID comparison judgment part 102. Referring to FIG. 2, the ASID comparison judgment part 102 includes a P channel MOS transistor 201 and a latch 202.

The source and drain of the MOS transistor 201 are connected to a power source PS and an ASID match line 105, respectively. An ASID comparison control signal 203 (comparison control signal) for controlling ASID comparison operation is provided to the gate of the MOS transistor 201.

The ASID comparison control signal 203 is provided to a control input terminal (C) of the latch 202. A data input terminal (D) of the latch 202 is connected to an ASID match line 105.

From an output terminal (O) of the latch 202, an ASID effective signal 107 is outputted and then provided to a virtual address comparison judgment part 104.

<A-1-5. Virtual Address Comparison Judgment Part Configuration>

Figure 3:
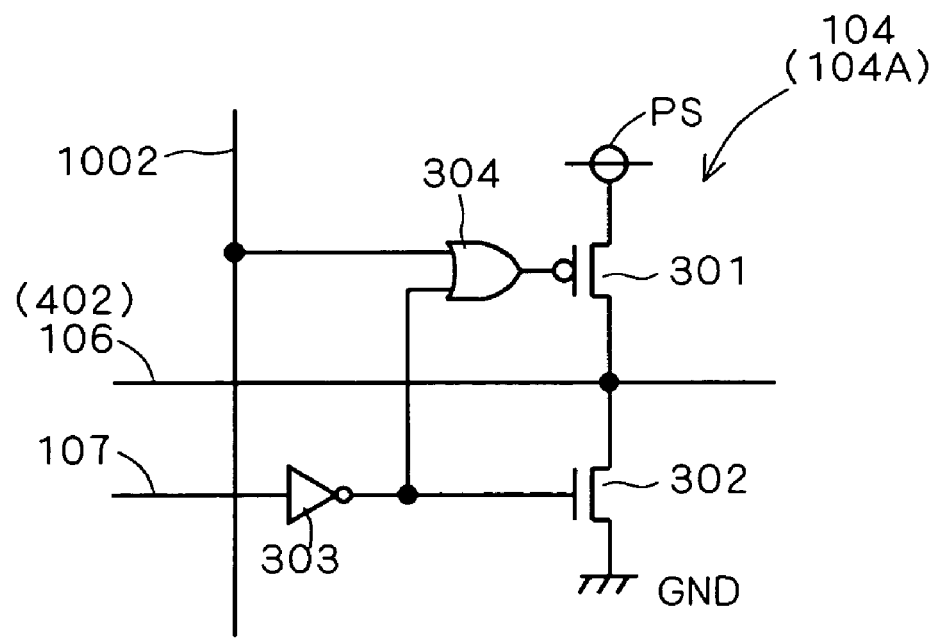
FIG. 3 is a diagram showing the configuration of a virtual address comparison judgment part.

FIG. 3 shows an example of the circuit configuration of a virtual address comparison judgment part 104. Referring to FIG. 3, the virtual address comparison judgment part 104 includes a P channel MOS transistor 301, an N channel MOS transistor 302, an inverter 303, and an OR gate 304.

The source and drain of the MOS transistor 301 are connected to a power source PS and a virtual address match line 106, respectively. The source and drain of the MOS transistor 302 are connected to a ground GND and a virtual address match line 106, respectively.

An ASID effective signal 107 is provided to the input of the inverter 303, and the output of the inverter 303 is connected to the gate of the MOS transistor 302 and one input of the OR gate 304.

A virtual address comparison control signal 1002 (comparison control signal) for controlling comparison operation is provided to another input of the OR gate 304. The output of the OR gate 304 is connected to the gate of the MOS transistor 301, and the output of the inverter 303 is connected to the gate of the N channel MOS transistor 302. The virtual address comparison control signal 1002 is a signal to be provided from the control part 805 via a control signal transmission path 818 to the virtual address comparison judgment part 104 corresponding to the individual tag entry part 808 in the tag part 806.

<A-1-6. CAM Cell Configuration>

Figure 4:
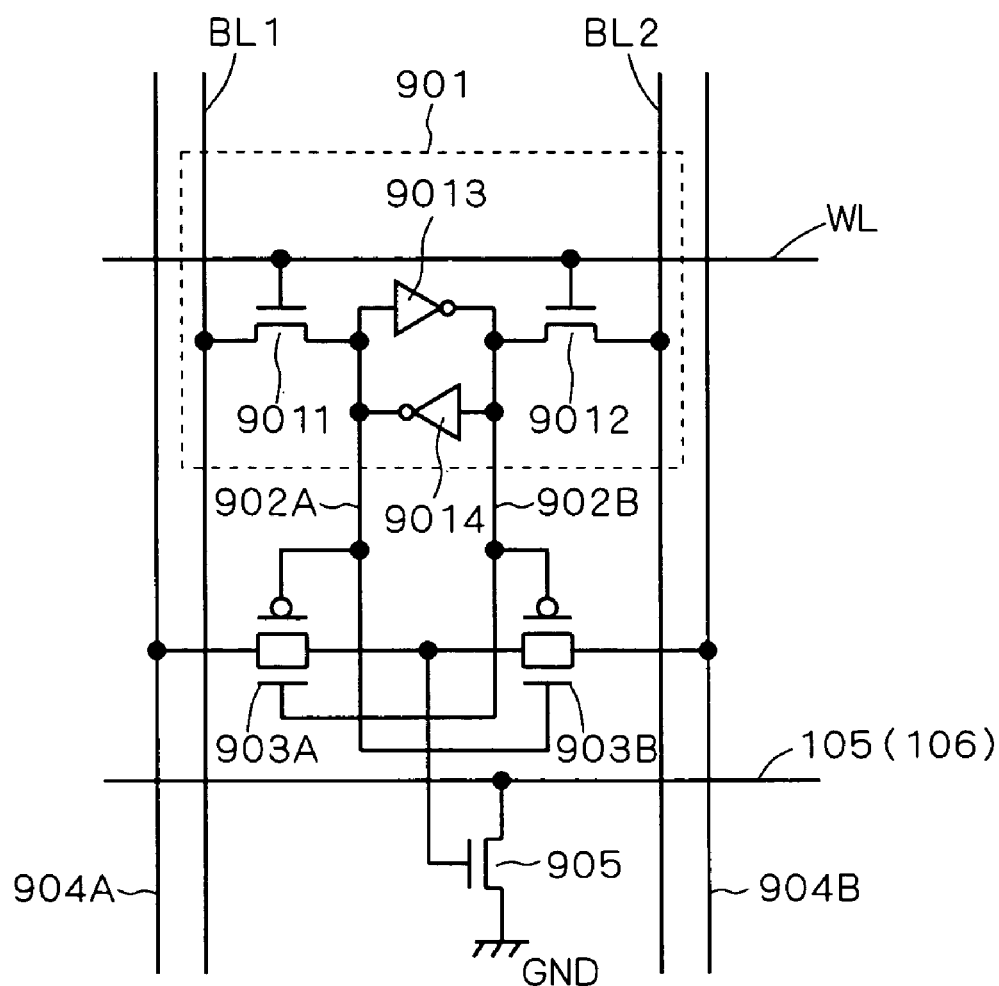
FIG. 4 is a diagram showing the configuration of a CAM cell.

FIG. 4 shows an example of the circuit configuration of a CAM cell 813. Referring to FIG. 4, the CAM cell 813 includes a memory circuit 901 that holds one of an ASID, virtual address and valid bit data, depending on the operating state of the TLB 100, CMOS transmission gates (hereinafter referred to as "TGs") 903A and 903B, and an N channel MOS transistor 905.

The memory circuit 901 has N channel MOS transistors 9011 and 9012, each gate of which is connected to a word line WL, and inverters 9013 and 9014 connected in antiparallel.

The input of the inverter 9013 and the output of the inverter 9014 are connected to the source of the MOS transistor 9011, and the drain of the MOS transistor 9011 is connected to a bit line BL1. The output of the inverter 9013 and the input of the inverter 9014 are connected to the source of the MOS transistor 9012, and the drain of the MOS transistor 9012 is connected to a bit line BL2.

A memory positive signal 902A indicting a positive logical value of a value held by the memory circuit 901 is outputted from the source of the MOS transistor 9011. A memory negative signal 902B indicating a negative logical value of a value held by the memory circuit 901 is outputted from the source of the MOS transistor 9012.

It is configured such that the memory positive signal 902A is provided to the gate of a P channel MOS transistor configuring the TG 903A and to the gate of a P channel MOS transistor configuring the TG 903B.

It is configured such that the memory negative signal 902B is provided to the gate of an N channel MOS transistor configuring the TG 903A and to the gate of an N channel MOS transistor configuring the TG 903B.

A comparison positive signal 904A and a comparison negative signal 904B are provided to the source of the TG 903A and the source of the TG 903B, respectively. The drains of the TG 903A and TG 903B are connected to the gate of the MOS transistor 905.

The comparison positive signal 904A is a signal indicating a positive logical value of an ASID, virtual address, or valid bit data that are to be inputted from the control part 805.

The comparison negative signal 904B is a signal indicating a negative logical value of an ASID, virtual address, or valid bit data that are to be inputted from the control part 805.

The drain and source of the MOS transistor 905 are connected to an ASID match line 105 (or a virtual address match line 106) and a ground GND, respectively.

<A-2. Unit Operation>

The operation of the TLB 100 will be described by referring to FIGS. 1 to 3.

When the TLB 100 does not perform any address translation operation, an ASID comparison control signal is at L level (i.e., low potential level), which is provided from the control part 805 via the ASID comparison control signal transmission path 103 to the ASID comparison judgment part 102 of each tag entry part 808 in the tag part 806.

For the above reason, the MOS transistor 201 of the ASID comparison judgment part 102 (FIG. 2) enters the on state, and the ASID match line 105 is charged to H level (high potential level).

If the content of the ASID register 802 is rewritten, an ASID register change notice signal 101 is provided to the control part 805 to notice that the content of the ASID register 802 has been rewritten.

When the fact that the content of the ASID register 802 is rewritten is notified to the control part 805, or when the hold content of the ASID hold part 810 of the tag entry part 808 in any one of the tag part 806 is changed, the control part 805 initiates ASID comparison operation.

Specifically, for example, in the case that the content of the ASID register 802 is rewritten, the control part 805 executes comparison operation between the content of the rewritten ASID register 802 (an ASID input value) and the hold content of the ASID hold part 810 (an ASID hold value) with respect to all the plurality of tag entry parts 808.

Hereat, the case that the hold content of the ASID hold part 810 is changed is as for example the case of rewriting the data in the tag entry part 808, which is a different operation from the rewriting of the ASID register 802.

When performing the ASID comparison operation, the ASID held in the ASID register 802 is inputted via an ASID input path 803 to the control part 805. During the ASID comparison operation, an ASID comparison control signal is at H level, which is provided from the control part 805 via an ASID comparison control signal transmission path 103 to the ASID comparison judgment part 102 of each tag entry part 808 in the tag part 806.

When the ASID comparison control signal becomes H level, the P channel transistor 201 of the ASID comparison judgment part 102 enters the off state.

Subsequently, an ASID is provided from the control part 805 via an ASID transmission path 814 to the tag part 806, and then provided to the plurality of CAM cells 813 of the ASID hold part 810 in each tag entry part 808.

The positive and negative logical values of the ASID provided to the ASID hold part 810 are provided to their respective corresponding CAM cells 813 (FIG. 4) as a comparison positive signal 904A and comparison negative signal 904B, respectively.

<A-2-1. CAM Cell and Tag Part Operations>

In the CAM cell 813, if the memory circuit 901 holds data "1", a memory positive signal 902A is at H level and a memory negative signal 902B is at L level. On the other hand, when the memory circuit 901 holds data "0", the memory positive signal 902A is at L level and the memory negative signal 902B is at H level.

Further, if the memory circuit 901 holds data "1", the TG 903A enters the off state and the TG 903B enters the on state. On the other hand, if the memory circuit 901 holds data "0", the TG 903A is in the on state and the TG 903B is in the off state.

Accordingly, when the memory circuit 901 holds data "1", a comparison negative signal 904B is provided via the TG 903B to the gate of the MOS transistor 905. When it holds data "0", a comparison positive signal 904A is provided via the TG 903A to the gate of the MOS transistor 905.

Therefore, in the case that the memory circuit 901 holds data "1", if a comparison value is 1, i.e., the comparison positive signal 904A is at H level and the comparison negative signal 904B is at L level, the gate of the MOS transistor 905 becomes L level and the MOS transistor 905 enters the off state.

Also in the case that the memory circuit 901 holds data "0", if a comparison value is 0, i.e., the comparison positive signal 904A is at L level and the comparison negative signal 904B is at H level, the gate of the MOS transistor 905 becomes L level and the MOS transistor 905 enters the off state.

On the other hand, in the case that the memory circuit 901 holds data "1", if a comparison value is 0, i.e., the comparison positive signal 904A is at L level and the comparison negative signal 904B is at H level, the gate of the MOS transistor 905 becomes H level and the MOS transistor 905 enters the on state.

Also in the case that the memory circuit 901 holds data "0", if a comparison value is 1, i.e., the comparison positive signal 904A is at H level and the comparison negative signal 904B is at L level, the drain of the MOS transistor 905 becomes H level and the MOS transistor 905 enters the on state.

Specifically, when the hold value of the memory circuit 901 matches the comparison value, the MOS transistor 905 enters the off state, and when they do not match, the MOS transistor 905 enters the on state.

As the result, when the hold value of the memory circuit 901 matches the comparison value in all the CAM cells 813 in the ASID hold part 810, the MOS transistor 905 in the individual CAM cell 813 enters the off state, and therefore the ASID match line 105 maintains H level. On the other hand, when at least one of a plurality of CAM cells 813 in the ASID hold part 810 mismatches a comparison value, the MOS transistor 905 in such a mismatch CAM cell 813 is at the on state, and therefore the ASID match line is discharged from H level to L level.

For example, if all the hold ASIDs in the ASID hold part 810 match the corresponding ASIDs to be inputted, the ASID match line 105 maintains H level. On the other hand, if there is at least one mismatch between the hold ASID and ASID to be inputted, the ASID match line 105 is discharged to L level.

Likewise, if all the hold virtual addresses in the virtual address hold part 811 match the corresponding virtual addresses to be inputted, the virtual address match line 106 maintains H level. On the other hand, if there is at least one mismatch between the hold virtual address and virtual address to be inputted, the virtual address match line 106 is discharged to L level.

<A-2-2. Operations of ASID Comparison Judgment Part and Virtual Address Comparison Judgment Part>

When an ASID comparison control signal provided from the control part 805 to the tag part 806 via the ASID comparison control signal transmission path 103 is at H level, the ASID comparison control signal 203 (FIG. 2) connected to the ASID comparison judgment part 102 in the individual tag entry part 808 becomes H level.

The latch 202 in the ASID comparison judgment part 102 takes a value of the ASID match line 105, and it holds this value when ASID comparison operation is terminated and the ASID comparison control signal 203 becomes L level.

An ASID effective signal 107 is outputted from an output terminal (O) of the latch 202 and then inputted to the virtual address comparison judgment part 104 that is disposed so as to correspond to the tag entry part 808 having the above-mentioned ASID comparison judgment part 102.

Specifically, in a tag entry part 808 having an ASID comparison result that the inputted ASID matches the hold ASID, its ASID match line 105 maintains H level and an ASID effective signal 107 of H level is inputted to the corresponding virtual address comparison judgment part 104.

On the other hand, in a tag entry part 808 having an ASID comparison result that the inputted ASID mismatches the hold ASID, its ASID match line 105 is discharged to L level, and an ASID effective signal 107 of L level is inputted to the corresponding virtual address comparison judgment part 104.

In the virtual address comparison judgment part 104, when the ASID effective signal 107 is at L level, a signal of H level is provided to the gate of the MOS transistor 301 via the inverter 303 (FIG. 3) and OR gate 304, and a signal of H level is provided to the gate of the MOS transistor 302 via the inverter 303.

Consequently, the MOS transistor 301 enters the off state, the MOS transistor 302 enters the on state, and the virtual address match line 106 is discharged via the MOS transistor 302 and becomes L level.

When the ASID effective signal 107 is at H level, a signal of L level is provided to the gate of the MOS transistor 302 via the inverter 303, and a signal of the same level as the virtual address comparison control signal 1002 is provided to the gate of the MOS transistor 301 via the OR gate 304.

Consequently, the MOS transistor 302 enters the off state, the MOS transistor 301 enters the on state when the virtual address comparison control signal 1002 is at L level, whereas it enters the off state when the signal 1002 is at H level.

Meanwhile, the virtual address comparison control signal 1002 is at L level when the TLB 100 does not perform any address transformation operation.

Therefore, in the virtual address comparison judgment part 104 corresponding to the tag entry part 808 in which the ASID effective signal 107 is at H level, the MOS transistor 301 enters the on state and the virtual address match line 106 is charged to H level.

On the other hand, in the virtual address comparison judgment part 104 corresponding to the tag entry part 808 in which the ASID effective signal 107 is at L level, the MOS transistor 302 enters the on state and the virtual address match line 106 is discharged to L level.

The circuit configured by the power source PS, MOS transistor 301, and wiring that connects them and also connects the drain of the MOS transistor 301 to the virtual address match line 106 can be called a "charge circuit" for charging the virtual address match line 106 that can functionally be an output line. In addition, the circuit configured by the OR gate 304 and its input and output lines etc. can be called a "charge inhibit circuit" for inhibiting charge to the virtual address match line 106 that can functionally be an output line.

<A-2-3. Translation from Virtual Address to Physical Address>

Prior to translation from a virtual address to a physical address, the virtual address comparison judgment part 104 performs virtual address comparison operation.

To this end, a virtual address is firstly inputted via the virtual address input path 801 to the control part 805. Subsequently, a virtual address comparison control signal 1002 becomes H level which is provided from the control part 805 via the control signal transmission path 818 to the individual virtual address comparison judgment part 104, and the MOS transistor 301 (FIG. 3) enters the off state. At this time, the MOS transistor 302 is already in the off state, so that the virtual address match line 106 enters the floating state while maintaining H level.

Subsequently, a virtual address is inputted from the control part 805 via the virtual address transmission path 815 to the individual tag entry part 808 of the tag part 806, and then provided to a plurality of CAM cells 813 of the individual address hold part 811.

In addition, a valid bit data is inputted from the control part 805 via the valid bit data transmission path 816 to the tag part 806, and then provided to a plurality of CAM cells 813 of the valid bit part 812 of the individual tag entry part 808.

Hereat, the positive and negative logical values of the virtual address and valid bit data that are provided to the virtual address hold part 811 and valid bit part 812 are provided to their respective corresponding CAM cells 813, as a comparison positive signal 904A and comparison negative signal 904B, respectively.

In the CAM cells 813 in the virtual address hold part 811 and valid bit part 812, a comparison between a hold value and comparison value is performed by the operation described previously.

That is, the virtual address match line 106 of the individual tag entry part 808 maintains H level when the hold value of the memory circuit 901 matches a comparison value in all the CAM cells 813 contained in the virtual address hold part 811 and valid bit part 812 in the individual tag entry part 808. Whereas the virtual address match line 106 is discharged to L level when at least one mismatch occurs.

Specifically, the virtual address match line 106 maintains H level when all the virtual addresses and valid bit data held by the individual tag entry part 808 match inputted virtual addresses and valid bit data, respectively. When at least one mismatch occurs, the virtual address match line 106 is discharged to L level. If the result of the comparison operation in the virtual address comparison judgment part 104 is that the virtual address match line 106 maintains H level, this indicates that the tag entry part 808 is the tag of a data entry part 809 having a physical address corresponding to the inputted ASID and virtual address.

At the completion of the virtual address comparison operation, the value of the virtual address match line 106 (of H level here) is provided via a comparison result notice path 820 to the data part 807 at a predetermined timing, and a physical address held by the data entry part 809 provided with H level is sent via a physical address transmission path 821 to the control part 805 and then outputted via a physical address output path 804, thereby executing translation from the virtual address to physical address. The outputted physical address is then provided to an external cache memory and peripheral circuit.

If the result of the virtual address comparison operation is that the hold value mismatches the comparison value, the virtual address match line 106 is discharged to L level. This indicates that the above-mentioned tag entry part 808 is not the tag of a data entry part 809 having a physical address corresponding to the inputted ASID and virtual address. Since the virtual address match line 106 is at L level, no address translation is executed even if provided to the data part 807.

Although in the foregoing description the virtual address match line 106 is discharged to L level when the hold values of the virtual address hold part 811 and the valid bit part 812 mismatch their respective comparison values, it is possible to configure such that the line 106 is discharged to L level when a value match occurs. The present invention is also applicable to such a configuration.

<A-3. Effects>

As described above, in the TLB 100 there are disposed (i) the ASID match line 105 outputting the result of a comparison between an ASID inputted to the ASID hold part 810 and a hold ASID; (ii) the virtual address match line 106 outputting the result of a comparison between a virtual address and valid bit data that are respectively inputted to the virtual address hold part 811 and valid bit part 812, and a hold virtual address and hold valid bit data; and (iii) the ASID comparison judgment part 102 connected to the ASID match line 105. Therefore, comparison operation only about ASID is possible when the content of the ASID register 802 is rewritten or when the content of the ASID hold part 810 in any tag entry part 808 is changed.

It is also possible to execute comparison operation only about a virtual address and valid bit data when performing translation operation from a virtual address to a physical address.

As the result, the translation operation from the virtual address to physical address requires only discharge of the electric charge with respect to the wiring capacities of the virtual address hold part 811 and valid bit part 812 and the drain capacity of a discharge transistor (i.e., the MOS transistor 905 in each CAM cell 813). That is, it is unnecessary to discharge the electric charge with respect to the wiring capacity of the ASID hold part 810 and the drain capacity of the discharge transistor. This permits a reduction in power consumption and an increase in comparison speed.

In addition, an ASID comparison result is provided as an ASID effective signal 107 to the virtual address comparison judgment part 104 and, when the ASID comparison result is a "mismatch", the virtual address match line 106 is fixed at L level. Therefore, when performing translation operation from a virtual address to a physical address, the virtual address comparison judgment part 104 takes, as a virtual address comparison object, only such a tag entry part 808 having a comparison result of "match". This enables to reduce power consumption due to discharge to the virtual address match line 106 of a tag entry part 808 having an ASID comparison result of "mismatch."

B. Second Preferred Embodiment

<B-1. Unit Configuration>

The configuration of a TLB 200 according to a second preferred embodiment of the present invention will be described with reference to FIG. 5. The same references have been retained for the same configuration as the TLB 100 shown in FIG. 1, and overlapping descriptions should be omitted here.

Figure 5:
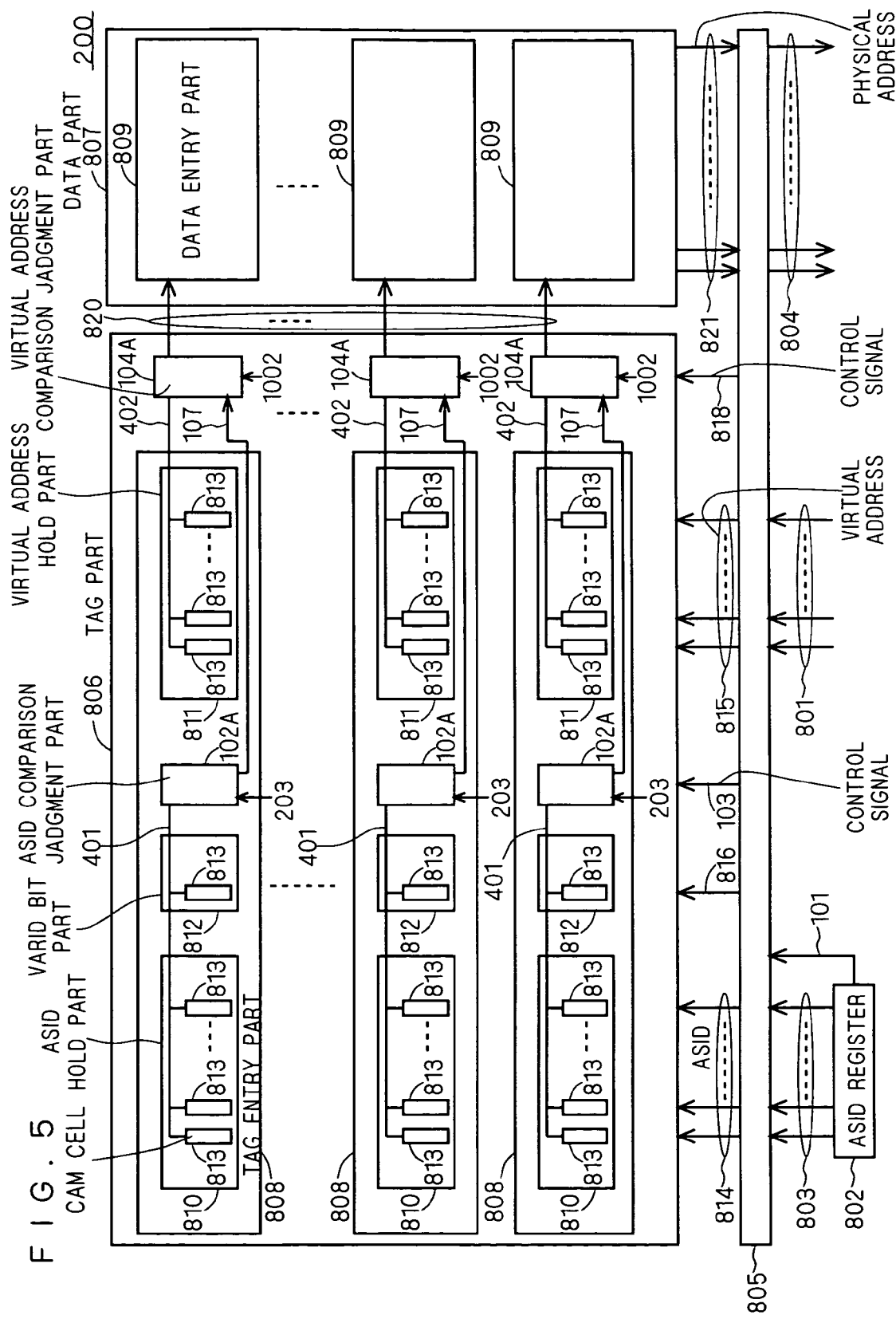
FIG. 5 is a block diagram to explain the configuration of a TLB according to a second preferred embodiment of the present invention.

Referring to FIG. 5, the TLB 200 includes a plurality of tag entry parts 808, in which by an ASID match line 401, a plurality of CAM cells 813 of an ASID hold part 810 are connected in parallel to a CAM cell 813 of a valid bit part 812, and also connected to an ASID comparison judgment part 102A.

A virtual address match line 402 connects a plurality of CAM cells 813 of a virtual address hold part 811 to a virtual address comparison judgment part 104A that corresponds to the tag entry part 808 including this virtual address hold part 811.

The ASID comparison judgment part 102A makes a comparison judgment between an ASID and valid bit data inputted to the tag entry part 808, and the hold contents in the ASID hold part 810 and valid bit part 812, respectively. The comparison address comparison judgment part 104A makes a comparison judgment between a virtual address inputted to the tag entry part 808 and the hold content of the virtual address hold part 811.

Although the configuration of the ASID comparison judgment part 102A is the same as the ASID comparison judgment part 102 described with reference to FIG. 2, the ASID match line 401 is disposed instead of the ASID match line 105.

Likewise, although the configuration of the virtual address comparison judgment part 104A is the same as the virtual address comparison judgment part 104 described with reference to FIG. 3, the virtual address match line 402 is disposed instead of the virtual address match line 106.

<B-2. Unit Operation>

The operation of the TLB 200 will next be described by referring to FIG. 5. Since the operation of the TLB 200 when it does not perform any address translation operation is the same as that of the TLB 100, its description should be omitted here.

If the content of the ASID register 802 is rewritten, an ASID register change notice signal 101 is provided to the control part 805 to notice that the content of the ASID register 802 has been changed.

When the control part 805 receives this notice, or when the hold content of any one of the tag entry parts 808 in the tag part 806 is changed, the control part 805 initiates ASID comparison operation.

When performing the ASID comparison operation, the ASID held at the ASID register 802 is inputted via an ASID input path 803 to the control part 805. During the ASID comparison operation, an ASID comparison control signal is at H level, which is provided from the control part 805 via an ASID comparison control signal transmission path 103 to the ASID comparison judgment part 102 of the individual tag entry part 808 in the tag part 806.

When the ASID comparison control signal becomes H level, a P channel transistor 201 of the ASID comparison judgment part 102 enters the off state.

Subsequently, an ASID is provided from the control part 805 via an ASID transmission path 814 to the tag part 806 and then to a plurality of CAM cells 813 of the ASID hold part 810 of the individual tag entry part 808.

Further, a valid bit data is inputted from the control part 805 via a valid bit data transmission path 816 to the tag pat 806 and then provided to the CAM cell 813 of the valid bit part 812 in each tag entry part 808.

The positive and negative logical values of the ASID and valid bit data provided to the ASID hold part 810 and valid bit part 812 are provided to their respective corresponding CAM cells 813 (FIG. 4) as a comparison positive signal 904A and comparison negative signal 904B, respectively.

The CAM cells 813 in the ASID hold part 810 and valid bit part 812 make a comparison between a hold value and comparison value by the operation previously described.

That is, the ASID match line 401 of the individual tag entry part 808 maintains H level when the hold value of a memory circuit 901 matches a comparison value in all the CAM cells 813 contained in the ASID hold part 810 and valid bit part 812 in the individual tag entry part 808. Whereas this ASID match line 401 is discharged to L level when at least one of the CAM cells 813 has a mismatch between the hold value of the memory circuit 901 and comparison value.

More specifically, the ASID match line 401 maintains H level when the ASID and valid bit data held per tag entry part 808 match the inputted ASID and valid bit data, respectively. Whereas the ASID match line 401 is discharged to L level when a mismatch occurs.

The operation of the ASID comparison judgment part 102A is the same as the ASID comparison judgment part 102 described in the first preferred embodiment, and overlapping description is therefore omitted here. It is however noted that in a tag entry part 808 having such an ASID comparison operation result that the inputted ASID and valid bit data match the hold ASID and valid bit data, its ASID match line 401 maintains H level and an ASID effective signal 107 of H level is inputted to the corresponding virtual address comparison judgment part 104A.

On the other hand, in a tag entry part 808 having a mismatch between the inputted ASID and valid bit data and the hold ASID and valid bit data, its ASID match line 401 is discharged to L level and an ASID effective signal 107 of L level is inputted to the corresponding address comparison judgment part 104A.

Since the operation of the virtual address comparison judgment part 104A when it does not perform any address translation operation is the same as the virtual address comparison judgment part 104 described in the first preferred embodiment, overlapping description should be omitted here.

Prior to translation from a virtual address to a physical address, the virtual address comparison judgment part 104A performs virtual address comparison operation. To this end, a virtual address is firstly inputted via a virtual address input path 801 to the control part 805. Subsequently, a virtual address comparison control signal 1002 becomes H level which is provided from the control part 805 via a control signal transmission path 818 to the individual virtual address comparison judgment part 104A, and a P channel MOS transistor 301 (FIG. 3) enters the off state. At this time, an MOS transistor 302 is already in the off state. Therefore, the virtual address match line 402 enters the floating state while maintaining H level.

Subsequently, a virtual address is inputted from the control part 805 via a virtual address transmission path 815 to the individual tag entry part 808 of the tag part 806, and then provided to a plurality of CAM cells 813 of the individual virtual address hold part 811.

The positive and negative logical values of the virtual address provided to the virtual address hold part 811 are provided to their respective corresponding CAM cells 813 as a comparison positive signal 904A and comparison negative signal 904B, respectively.

Thereafter, the CAM cell 813 in the virtual address hold part 811 makes a comparison between the hold value and comparison value by the operation previously described.

Specifically, the virtual address match line 402 of the individual tag entry part 808 maintains H level when the hold value of the memory circuit 901 matches a comparison value in all the CAM cells 813 contained in the virtual address hold part 811 of the individual tag entry part 808. Whereas the virtual address match line 402 is discharged to L level when a mismatch between the hold value of the memory circuit 901 and a comparison value occurs in at least one of the CAM cells 813.

At the completion of the virtual address comparison operation, the value of the virtual address match line 402 (of H level here) is provided via a comparison result notice path 820 to the data part 807 at a predetermined timing, and a physical address held by the data entry part 809 provided with H level is sent via a physical address transmission path 821 to the control part 805 and then outputted via a physical address output path 804, thereby completing translation from the virtual address to physical address.

Although in the foregoing description the virtual address match line 402 is discharged to L level when the hold value of the virtual address hold part 811 mismatches a comparison value, it is possible to configure such that the line 402 is discharged to L level when a value match occurs. The present invention is also applicable to such a configuration.

<B-3. Effects>

As described above, in the TLB 200 there are disposed (i) the ASID match line 401 outputting the result of a comparison between an ASID and valid bit data that are respectively inputted to the ASID hold part 810 and valid bit part 812, and the hold ASID and hold valid bit data; (ii) the virtual address match line 402 outputting the result of a comparison between a virtual address inputted to the virtual address hold part 811 and a hold virtual address; and (iii) the ASID comparison judgment part 102 connected to the ASID match line 401. Therefore, comparison operation only about an ASID and valid bit data is possible when the content of the ASID register 802 is rewritten, or when the hold content of the ASID hold part 810 or the hold content of the valid bit part 812 in any tag entry part 808 is changed.

It is also possible to execute comparison operation only about a virtual address when performing translation operation from a virtual address to a physical address.

As the result, the translation operation from the virtual address to physical address requires only discharge of the electric charge with respect to the wiring capacity of the virtual address hold part 811 and the drain capacity of a discharge transistor (i.e., the MOS transistor 905 in each CAM cell 813). That is, it is unnecessary to discharge the electric charge with respect to the wiring capacity of the ASID hold part 810 and the drain capacity of the discharge transistor. This permits a reduction in power consumption and an increase in comparison speed.

The frequency at which the ASID register 802 is changed is lower than the frequency of performing translation operation from a virtual address to a physical address. Therefore, comparison operation about ASID and valid bit data is subjected to less influence due to an increase in power consumption.

When comparing an ASID, valid bit data is also compared in addition to the ASID. With this configuration, an ASID effective signal 107 can be brought into H level only in the case that the hold content of the individual tag entry part 808 is effective and its hold ASID matches the content of the ASID register 802, and the ASID effective signal 107 can be brought into L level in other case.

By providing this ASID effective signal 107 to the virtual address comparison judgment part 104A, the virtual address match line 402 can be fixed at L level when the hold content is invalid or the hold ASID mismatches the content of the ASID register 802. Therefore, when performing translation operation from a virtual address to a physical address, the virtual address comparison judgment part 104A takes, as a virtual address comparison object, only such a tag entry part 808 that the hold content is effective and the hold ASID matches the value of the ASID register 802. With this configuration, it is possible to reduce power consumption due to discharge to the virtual address match line 402 in such as tag entry part 808 that the hold content is invalid or the hold ASID mismatches the value of the ASID register 802.

C. Third Preferred Embodiment

<C-1. Unit Configuration>

<C-1-1. Overall Configuration>

The configuration of a TLB 300 according to a third preferred embodiment of the present invention will be described with reference to FIG. 6. The same references have been retained for the same configuration as the TLB 100 shown in FIG. 1, and overlapping descriptions should be omitted here.

Figure 6:
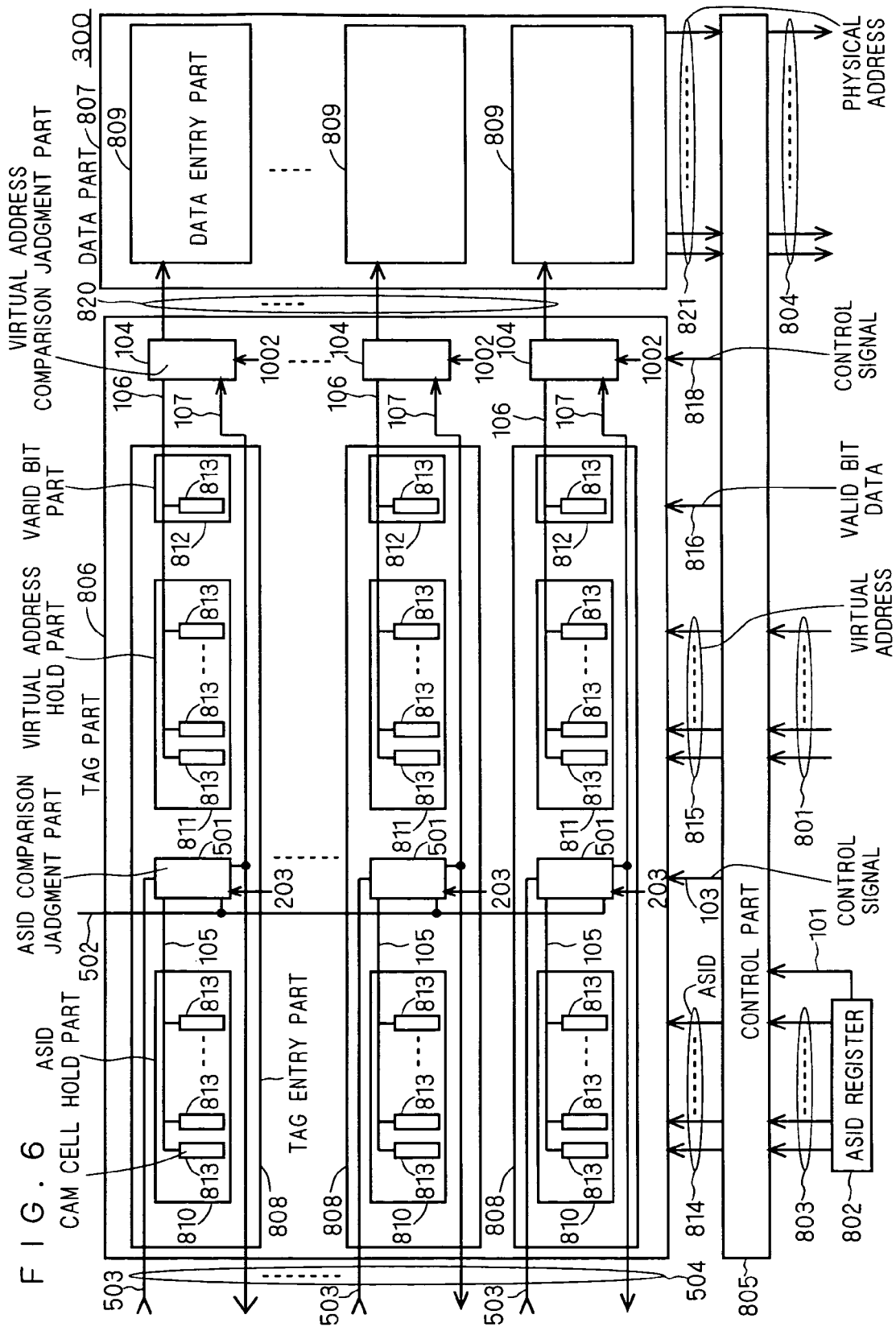
FIG. 6 is a block diagram to explain the configuration of a TLB according to a third preferred embodiment of the present invention.

Referring to FIG. 6, the TLB 300 has an ASID comparison judgment part 501 in place of the ASID comparison judgment part 102 in the TLB 100. A test data control signal 502 (selective control signal) and test data input signal 503 (external signal) are provided to the ASID comparison judgment part 501.

The test data control signal 502 and test data input signal 503 are signals used for TLB operation test which are for example provided from a test circuit disposed on a semiconductor chip or a tester disposed externally of a chip.

An ASID effective signal 107 is created in the ASID comparison judgment part 501 as in the ASID comparison judgment part 102. This ASID effective signal 107 is provided not only to a virtual address comparison judgment part 104 but also outputted to the exterior.

Here, a path through which the ASID effective signal 107 is outputted to the exterior, and a path through which the test data input signal 503 is inputted from the exterior are generally referred to as a test data input/output path 504.

<C-1-2. ASID Comparison Judgment Part Configuration>

Figure 7:
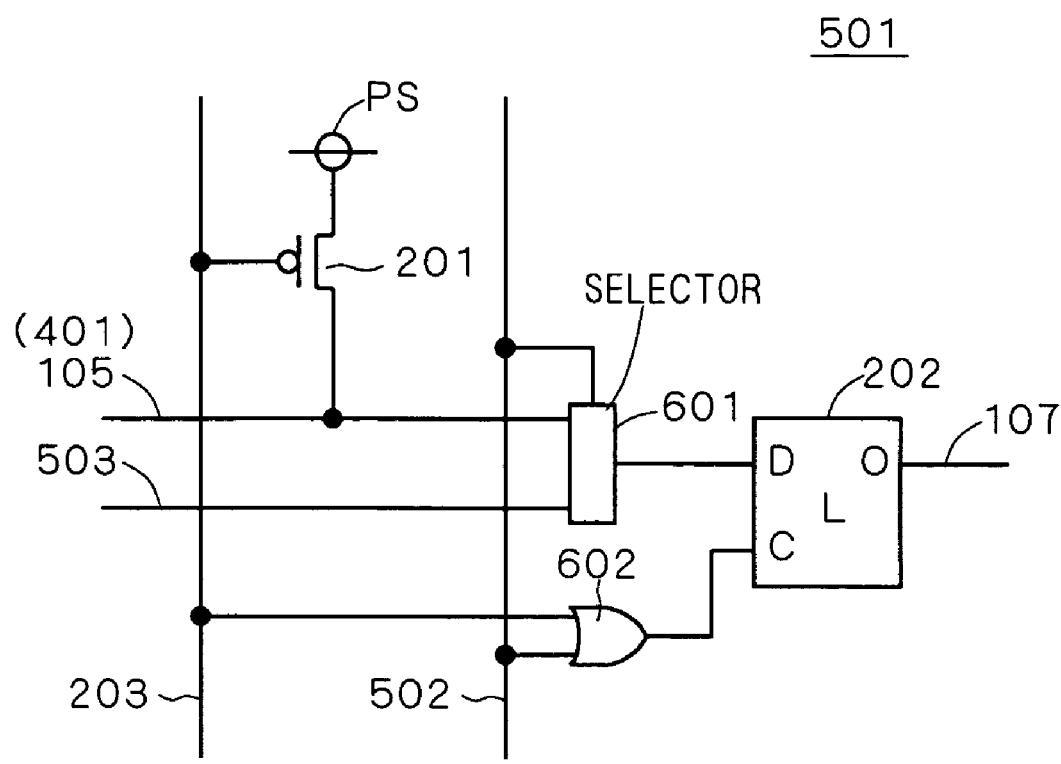
FIG. 7 is a diagram showing the configuration of a virtual address comparison judgment part.

FIG. 7 shows an example of the circuit configuration of an ASID comparison judgment part 501. Referring to FIG. 7, the ASID comparison judgment part 501 includes a P channel MOS transistor 201, a latch 202, a selector 601, and an OR gate 602.

The source and drain of the MOS transistor 201 are connected to a power source PS and ASID match line 105, respectively. An ASID comparison control signal 203 controlling ASID comparison operation is provided to the gate of the MOS transistor 201.

A test data control signal 502 is inputted as a control signal of selective operation, and a signal of the ASID match line 105 and the test data input signal 503 are inputted as an input signal, to the selector 601, and its output is provided to a data input terminal (D) of the latch 202.

The test data control signal 502 and ASID comparison control signal 203 are provided to the OR gate 602, and its output is provided to a control input terminal (C) of the latch 202.

From an output terminal (0) of the latch 202, an ASID effective signal 107 is outputted and then provided to the virtual address comparison judgment part 104.

<C-2. Unit Operation>

The operation of the TLB 300 will be described by referring to FIGS. 6 and 7. Its basic operation is the same as that of the TLB 100. Therefore, overlapping description should be omitted here, and the following description consists mainly of the operation of the ASID comparison judgment part 501.

The selector 601 is configured so as to select an ASID match line 105 when a signal of L level is provided as a test data control signal 502. A signal of the ASID match line 105 is inputted to the data input terminal (D) of the latch 202. When the test data control signal 502 is at L level, the output of the OR gate 602 matches an ASID comparison control signal 203.

Accordingly, the configuration in the case that the signal of L level is provided as a test data control signal 502 is substantially the same as that of the TLB 100 in the first preferred embodiment. This results in the same ASID comparison operation and translation operation from a virtual address to a physical address as in the TLB 100.

On the other hand, when a signal of H level is provided as a test data control signal 502, the selector 601 is configured so as to select a test data input signal 503, and the test data input signal 503 is inputted to the data input terminal (D) of the latch 202.

In addition, when the test data control signal 502 is at H level, the latch 202 takes a value of the data input terminal, namely the value of the test data input signal 503, and then outputs it as an ASID effective signal 107.

In the virtual address comparison judgment part 104 provided with the ASID effective signal 107, i.e., the test data input signal 503, charge and discharge of the virtual address match line 106 can be set arbitrarily based on the level of the test data input signal 503.

<C-3. Effects>

As described above, in the TLB 300, the output of the latch 202 of the ASID comparison judgment part 501 can forcedly be changed to the value of the test data input signal 503 by the test data control signal 502. Therefore, even when performing no ASID comparison operation, the output of the latch 202 is changeable. This facilitates a test of translation operation from a virtual address to a physical address.

Further, with the configuration that the ASID effective signal 107 is outputted via the test data input/output path 504 to the exterior of the TLB, it is possible to directly observe ASID comparison operation from the exterior of the TLB, thereby effectively performing tests about the following virtual address comparison operation and translation operation from a virtual address to a physical address.

D. Fourth Preferred Embodiment

<D-1. Unit Configuration>

<D-1-1. Overall Configuration>

The configuration of a TLB 400 according to a fourth preferred embodiment of the present invention will be described with reference to FIG. 8. The same references have been retained for the same configuration as the TLB 200 shown in FIG. 5 and the TLB 300 shown in FIG. 6, and overlapping descriptions should be omitted here.

Figure 8:
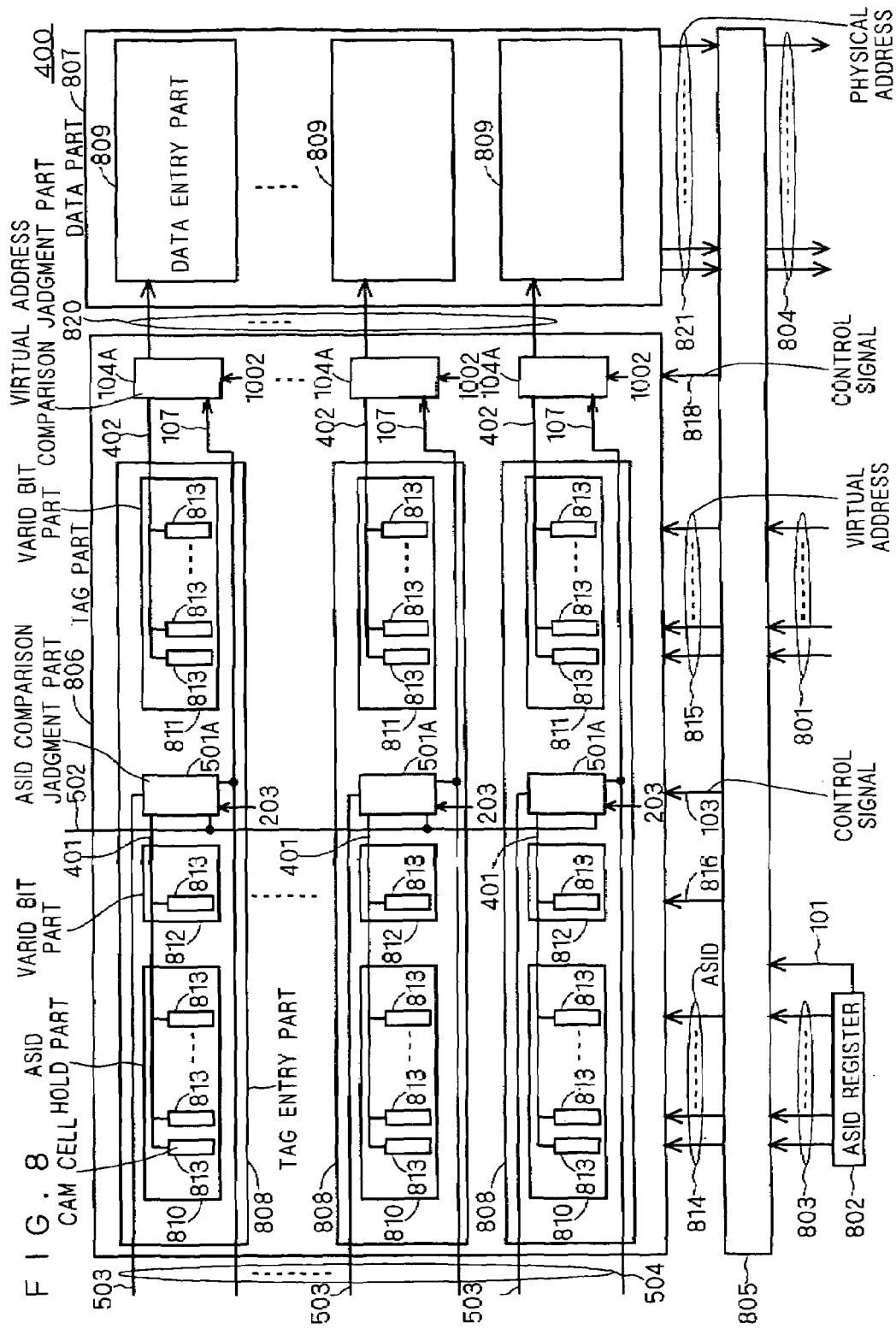
FIG. 8 is a block diagram to explain the configuration of a TLB according to a fourth preferred embodiment of the present invention.

Referring to FIG. 8, the TLB 400 has an ASID comparison judgment part 501A in place of the ASID comparison judgment part 102A in the TLB 200. A test data control signal 502 and test data input signal 503 are provided to the ASID comparison judgment part 501A.

The configuration of the ASID comparison judgment part 501A is basically the same as that of the ASID comparison judgment part 501 described with reference to FIG. 7, and overlapping description should be omitted here. It is however noted that as an input data of the selector 601, the value of an ASID match line 401 is provided in place of the value of the ASID match line 105.

<D-2. Unit Operation>

The operation of the TLB 400 will next be described by referring to FIGS. 7 and 8. Its basic operation is the same as that of the TLB 200. Therefore, overlapping description should be omitted here, and the following description consists mainly of the operation of the ASID comparison judgment part 501A.

The selector 601 is configured so as to select the ASID match line 401 when a signal of L level is provided as a test data control signal 502. A signal of the ASID match line 401 is inputted to the data input terminal (D) of the latch 202. When the test data control signal 502 is at L level, the output of the OR gate 602 matches the ASID comparison control signal 203.

Accordingly, the configuration in the case that the signal of L level is provided as a test data control signal 502 is substantially the same as that of the TLB 200 in the second preferred embodiment. This results in the same ASID comparison operation and translation operation from a virtual address to a physical address as in the TLB 200.

On the other hand, when a signal of H level is provided as a test data control signal 502, the selector 601 is configured so as to select a test data input signal 503, and the test data input signal 503 is inputted to the data input terminal (D) of the latch 202.

In addition, when the test data control signal 502 is at H level, the latch 202 takes the value of the data input terminal, namely the value of the test data input signal 503, and then outputs it as an ASID effective signal 107.

In the virtual address comparison judgment part 104 provided with the ASID effective signal 107, i.e., the test data input signal 503, charge and discharge of the virtual address match line 402 can be set arbitrarily based on the level of the test data input signal 503.

<D-3. Effects>

As described above, in the TLB 400, the output of the latch 202 of the ASID comparison judgment part 501A can forcedly be changed to the value of the test data input signal 503 by the test data control signal 502. Therefore, even when performing no ASID comparison operation, the output of the latch 202 is changeable. This facilitates a test of translation operation from a virtual address to a physical address.

Further, with the configuration that the ASID effective signal 107 is outputted via the test data input/output path 504 to the exterior of the TLB, it is possible to directly observe an ASID comparison operation from the exterior of the TLB, thereby effectively performing tests about the following virtual address comparison operation and translation operation from a virtual address to a physical address.

<E. Modification of Valid Bit Part>

<E-1. When Applied to First and Third Preferred Embodiments>

In the TLBs 100 and 300 according to the first and third preferred embodiments of the present invention with reference to FIGS. 1 and 6, respectively, the valid bit part 812 is configured by one CAM cell 813 and the configuration of the CAM cell 813 is explained with reference to FIG. 4.

Meanwhile, the valid bit part 812 may substitute a normal SRAM (static RAM) cell for the CAM cell 813. In this case, the virtual address comparison judgment part 104 is so configured as shown in FIG. 9.

A desirable configuration of the virtual address comparison judgment part 104 when the valid bit part 812 is configured by a SRAM cell will be described with reference to FIG. 9.

Figure 9:
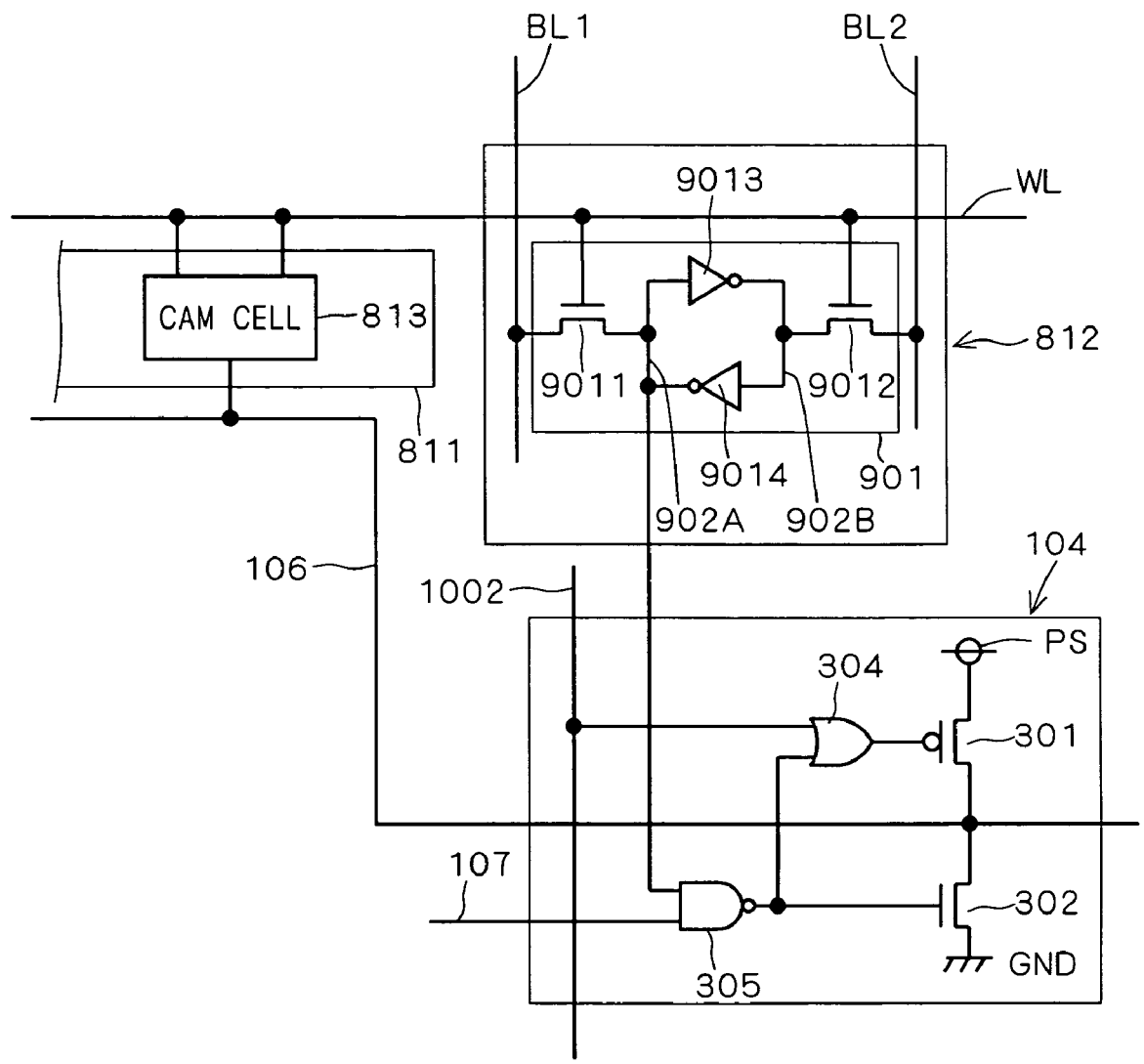
FIGS. 9 and 10 are diagrams to explain a modification of the configuration of a valid bit part.

As shown in FIG. 9, the memory circuit 901 that was explained with reference to FIG. 4 may be used for the SRAM cell configuring the valid bit 812.

The memory positive signal 902A indicting the positive logical value of the value held by the memory circuit 901 is outputted from the source of the MOS transistor 9011. The memory negative signal 902B indicating the negative logical value of the value held by the memory circuit 901 is outputted from the source of the MOS transistor 9012.

The virtual address comparison judgment part 104 shown in FIG. 9 includes the P channel MOS transistor 301, the N channel MOS transistor 302, the OR gate 304, and a NAND gate 305.

The source and drain of the MOS transistor 301 are connected to the power source PS and the virtual address match line 106, respectively. The source and drain of the MOS transistor 302 are connected to the ground GND and the virtual address match line 106, respectively.

The ASID effective signal 107 is provided to one input of the NAND gate 305, and the memory positive signal 902A outputted from the memory circuit 901 is provided to another input of the NAND gate 305. The output of the NAND gate 305 is connected to the gate of the MOS transistor 302 and one input of the OR gate 304.

The virtual address comparison control signal 1002 (comparison control signal) for controlling comparison operation is provided to another input of the OR gate 304. The output of the OR gate 304 is connected to the gate of the MOS transistor 301.

We assume that, in the valid bit part 812, the case where the memory positive signal 902A is at H level and the memory negative signal 902B is at L level is "valid" and the case where the memory positive signal 902A is at L level and the memory negative signal 902B is at H level is "invalid". When the valid bit part 812 is "invalid", the virtual address match line 106 is forcedly changed to L level.

On the contrary, when the valid bit part 812 is "valid", the logic corresponding to the comparison result of the virtual addresses appear on the virtual address match line 106.

<E-2. When Applied to Second and Fourth Preferred Embodiments>

Also in the TLBs 200 and 400 according to the second and fourth preferred embodiments of the present invention, the valid bit part 812 may substitute a normal SRAM cell for the CAM cell 813. In this case, the ASID comparison judgment part 102A is so configured as shown in FIG. 10.

A desirable configuration of the ASID comparison judgment part 102A when the valid bit part 812 is configured by a SRAM cell will be described with reference to FIG. 10.

Figure 10:
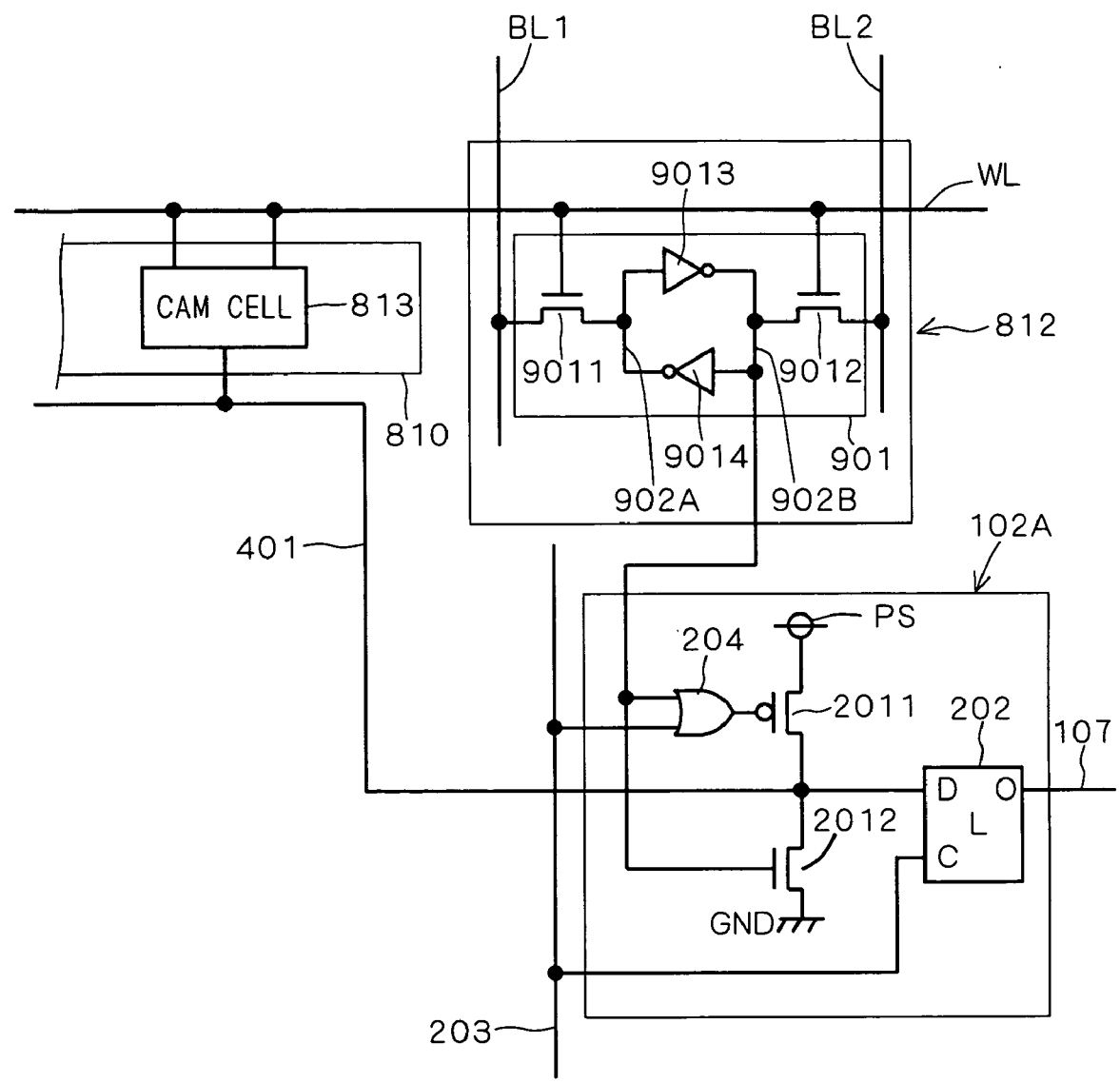

As shown in FIG. 10, the memory circuit 901 that was explained with reference to FIG. 4 may be used for the SRAM cell configuring the valid bit 812. The configuration of the memory circuit 901 has been explained above and is thus omitted here.

The ASID comparison judgment part 102A shown in FIG. 10 includes a P channel MOS transistor 2011, an N channel MOS transistor 2012, an OR gate 204, and the latch 202.

The source and drain of the MOS transistor 2011 are connected to the power source PS and the ASID match line 401, respectively. The source and drain of the MOS transistor 2012 are connected to the ground GND and the ASID match line 401, respectively.

The memory negative signal 902B outputted from the memory circuit 901 is provided to one input of the OR gate 204, and the ASID comparison control signal 203 for controlling ASID comparison operation is provided to another input of the OR gate 204. The output of the OR gate 204 is connected to the gate of the MOS transistor 2011. The memory negative signal 902B outputted from the memory circuit 901 is provided to the gate of the MOS transistor 2012.

The ASID comparison control signal 203 is provided to the control input terminal (C) of the latch 202. The data input terminal (D) of the latch 202 is connected to the ASID match line 401. The ASID effective signal 107 is outputted from the output terminal (O) of the latch 202.

We assume that, in the valid bit part 812, the case where the memory positive signal 902A is at H level and the memory negative signal 902B is at L level is "valid" and the case where the memory positive signal 902A is at L level and the memory negative signal 902B is at H level is "invalid".

When the valid bit part 812 is "invalid", the ASID match line 401 is forcedly changed to L level, and thus the ASID effective signal 107 becomes L level.

On the contrary, when the valid bit part 812 is "valid", the logic corresponding to the comparison result of the ASIDs appear on the ASID match line 401.

In the configuration as shown in FIG. 10, when the valid bit part 812 is "invalid", the MOS transistor 2011 does not pre-charge the ASID match line, thereby further reducing power consumption.

While the invention has been shown and described in detail, the foregoing description is in all aspects illustrative and not restrictive. It is therefore understood that numerous modifications and variations can be devised without departing from the scope of the invention.

What is claimed is:

1. An address translation unit performing address translation from a virtual address to a physical address, comprising:
   a data entry part holding data of said physical address; and
   a tag entry part storing an address space identifier and virtual address as a tag of said data entry part,
   said tag entry part comprising:
      an address space identifier hold part holding said address space identifier;
      an address space identifier comparison judgment part comparing an address space identifier hold value held in said address space identifier hold part with an address space identifier input value to be inputted newly;
      a virtual address hold part holding said virtual address; and
      a virtual address comparison judgment part comparing a virtual address hold value held in said virtual address hold part with a virtual address input value to be inputted newly,
   said virtual address comparison judgment part having a charge circuit for charging its output line and a charge inhibit circuit for inhibiting charge to said output line, wherein a potential state of said output line is controlled based on the comparison result between said address space identifier hold value and said address space identifier input value, to determine execution or non-execution of comparison operation between said virtual address hold value and said virtual address input value at the time of address translation,
   wherein said address space identifier hold part and said virtual address hold part are each configured by a content addressable memory,
   a content addressable memory cell configuring said address space identifier hold part is connected to an address space identifier comparison match line and also connected to said address space identifier comparison judgment part,
   a content addressable memory cell configuring said virtual address hold part is connected to a virtual address comparison match line and also connected to said virtual address comparison judgment part, and
   said virtual address comparison judgment part receives a comparison result signal obtained in said address space identifier comparison judgment part and, when said address space identifier hold value matches said address space identifier input value, maintains said virtual address comparison match line in a floating state and performs a comparison at least between said virtual address hold value and said virtual address input value.

2. The address translation unit according to claim 1 further comprising:
   a valid bit part holding information as to whether data of said tag entry part is effective,
   wherein said valid bit part is configured by a content addressable memory,
   said virtual address comparison match line is also connected to a content addressable memory cell configuring said valid bit part, and
   said virtual address comparison judgment part also performs a comparison between a valid bit hold value held in said valid bit part and a valid bit input value to be inputted newly.

3. The address translation unit according to claim 2 wherein
   said virtual address comparison judgment part determines execution or non-execution of comparison operation between said virtual address hold value and said virtual address input value, based on the comparison result between said address space identifier hold value and said address space identifier input value, and said valid bit hold value.

4. The address translation unit according to claim 1 wherein said address space identifier comparison judgment part comprises:
   an MOS transistor; and
   a latch,
   said MOS transistor having a first main electrode connected to a power source, a second main electrode connected to said address space identifier comparison match line, and a control electrode to which a comparison control signal for controlling comparison operation is provided, and
   said latch having a data input terminal connected to said address space identifier comparison match line, a control input terminal to which said comparison control signal is provided, and an output terminal outputting said comparison result signal.

5. The address translation unit according to claim 1 wherein said virtual address comparison judgment part comprises:
   first and second MOS transistors that are connected in series and have different conductivity types;
   an inverter; and
   an OR gate,
   said first MOS transistor having a first main electrode connected to a first power source and a second main electrode connected to said virtual address comparison match line,
   said second MOS transistor having a first main electrode connected to said virtual address comparison match line and a second main electrode connected to a second power source,
   said inverter having an input to which said comparison result signal is provided, and an output connected to a control electrode of said second MOS transistor and one input of said OR gate, and
   said OR gate having another input to which a comparison control signal for controlling comparison operation is provided and an output connected to a control electrode of said first MOS transistor.

6. The address translation unit according to claim 1 wherein
   said address space identifier comparison judgment part further has a function by which an external signal provided from the exterior is received and one of said comparison result signal and said external signal is selected and provided to said virtual address comparison judgment part, and said address translation unit further has an output path through which said comparison result signal is outputted to the exterior.

7. The address translation unit according to claim 6 wherein said address space identifier comparison judgment part comprises:
an MOS transistor;
a latch;
a selector; and
an OR gate,
said MOS transistor having a first main electrode connected to a power source, a second main electrode connected to said address space identifier comparison match line, and a control electrode to which a comparison control signal controlling comparison operation is provided,
said selector to which a selective control signal is provided as a control signal for selective operation and a signal of said address space identifier comparison match line and said external signal are provided as an input signal, said selector providing its output to a data input terminal of said latch,
said OR gate having one input to which said comparison control signal is provided and another input to which said selective control signal is provided, said OR providing its output to a control input terminal of said latch, and
an output terminal of said latch outputting said comparison result signal or said external signal.

8. An address translation unit performing address translation from a virtual address to a physical address, comprising:
a data entry part holding data of said physical address; and
a tag entry part storing an address space identifier and virtual address as a tag of said data entry part,
said tag entry part comprising:
a valid bit part holding information as to whether data of said tag entry part is valid;
an address space identifier hold part holding said address space identifier;
an address space identifier comparison judgment part comparing an address space identifier hold value held in said address space identifier hold part and a valid bit hold value held in said valid bit part, with an address space identifier input value and valid bit input value that are inputted newly;
a virtual address hold part holding said virtual address; and
a virtual address comparison judgment part comparing a virtual address hold value held in said virtual address hold part with a virtual address input value to be inputted newly,
wherein said virtual address comparison judgment part determines execution or non-execution of comparison operation between said virtual address hold value and said virtual address input value at the time of address translation, based on the comparison result between said address space identifier hold value and said address space identifier input value, and said information as to whether data of said tag entry part is valid or invalid.

9. The address translation unit according to claim 8 wherein said address space identifier comparison judgment part determines execution or non-execution of comparison operation between said address space identifier hold value and said address space identifier input value, based on said valid bit hold value.

10. The address translation unit according to claim 9 wherein said address space identifier hold part, said virtual address hold part, and said valid bit part are each configured by a content addressable memory,
a content addressable memory cell configuring said address space identifier hold part and a content addressable memory cell configuring said valid bit part are connected in parallel to each other and also connected to said address space identifier comparison judgment part by an address space identifier comparison match line,
a content addressable memory cell configuring said virtual address hold part is connected to a virtual address comparison match line and also connected to said virtual address comparison judgment part, and
said virtual address comparison judgment part receives a comparison result signal obtained in said address space identifier comparison judgment part, in which when said address space identifier hold value and said valid bit hold value match said address space identifier input value and said valid bit input value, respectively, said virtual address comparison match line is maintained in a floating state and said virtual address hold value is compared with said virtual address input value.

11. The address translation unit according to claim 10 wherein said address space identifier comparison judgment part comprises:
an MOS transistor; and
a latch,
said MOS transistor having a first main electrode connected to a power source, a second main electrode connected to said address space identifier comparison match line, and a control electrode to which a comparison control signal for controlling comparison operation is provided, and
said latch having a data input terminal connected to said address space identifier comparison match line, a control input terminal to which said comparison control signal is provided, and an output terminal outputting said comparison result signal.

12. The address translation unit according to claim 10 wherein said virtual address comparison judgment part comprises:
first and second MOS transistors that are connected in series and have different conductivity types;
an inverter; and
an OR gate,
said first MOS transistor having a first main electrode connected to a first power source and a second main electrode connected to said virtual address comparison match line,
said second MOS transistor having a first main electrode connected to said virtual address comparison match line and a second main electrode connected to a second power source,
said inverter having an input to which said comparison result signal is provided and an output connected to a control electrode of said second MOS transistor and one input of said OR gate, and
said OR gate having another input to which a comparison control signal for controlling comparison operation is provided and an output connected to a control electrode of said first MOS transistor.

13. The address translation unit according to claim 10 wherein said address space identifier comparison judgment part further has a function by which an external signal provided from the exterior is received and one of said comparison result signal and said external signal is selected and provided to said virtual address comparison judgment part, and said address translation unit further has an output path through which said comparison result signal is outputted to the exterior.

14. The address translation unit according to claim 13 wherein said address space identifier comparison judgment part comprises:

an MOS transistor;
a latch;
a selector; and
an OR gate, said MOS transistor having a first main electrode connected to a power source, a second main electrode connected to said address space identifier comparison match line, and a control electrode to which a comparison control signal for controlling comparison operation is provided, said selector to which a selective control signal is provided as a control signal of selective operation and a signal of said address space identifier comparison match line and said external signal are provided as an input signal, said selector providing its output to a data input terminal of said latch, said OR gate having one input to which said comparison control signal is provided and another input to which said selective control signal is provided, said OR gate providing its output to a control input terminal of said latch, and an output terminal of said latch outputting said comparison result signal or said external signal.

15. The address translation unit according to claim 8 wherein said virtual address comparison judgment part compares said virtual address hold value with said virtual address input value at the time of address translation, when said address space identifier hold value matches said address space identifier input value and also said valid bit hold value matches said valid bit input value, and does not compare said virtual address hold value with said virtual address input value at the time of address translation, when said address space identifier hold value mismatches said address space identifier input value or said valid bit hold value mismatches said valid bit input value.

* * * * *